United States Patent
Kinoshita et al.

(10) Patent No.: US 11,891,502 B2
(45) Date of Patent: Feb. 6, 2024

(54) DISPERSANT FOR POWER STORAGE DEVICE POSITIVE ELECTRODE

(71) Applicant: KAO CORPORATION, Tokyo (JP)

(72) Inventors: Yutaro Kinoshita, Wakayama (JP); Akito Itoi, Wakayama (JP); Atsushi Hiraishi, Wakayama (JP); Takahiro Yano, Wakayama (JP); Akihiro Koyama, Wakayama (JP)

(73) Assignee: KAO CORPORATION, Tokyo (JP)

( * ) Notice: Subject to any disclaimer, the term of this patent is extended or adjusted under 35 U.S.C. 154(b) by 64 days.

(21) Appl. No.: 17/602,580

(22) PCT Filed: Dec. 27, 2019

(86) PCT No.: PCT/JP2019/051591
§ 371 (c)(1),
(2) Date: Oct. 8, 2021

(87) PCT Pub. No.: WO2020/208881
PCT Pub. Date: Oct. 15, 2020

(65) Prior Publication Data
US 2022/0177691 A1    Jun. 9, 2022

(30) Foreign Application Priority Data
Apr. 12, 2019  (WO) .................. PCT/JP2019/015908

(51) Int. Cl.
*H01M 4/60* (2006.01)
*H01B 1/24* (2006.01)
(Continued)

(52) U.S. Cl.
CPC .............. *C08L 33/10* (2013.01); *C08L 33/26* (2013.01); *C08L 39/08* (2013.01); *H01B 1/24* (2013.01);
(Continued)

(58) Field of Classification Search
CPC ... H01B 1/00; H01B 1/05; H01B 1/06; H01B 1/24; H01M 4/625; C08K 3/041
See application file for complete search history.

(56) References Cited

U.S. PATENT DOCUMENTS

2015/0028264 A1* 1/2015 Kuwahara ............. H01M 4/623
                                                          252/506
2015/0132643 A1  5/2015 Sasaki
(Continued)

FOREIGN PATENT DOCUMENTS

CA       694863 A    9/1964
CN    101420035 A    4/2009
(Continued)

OTHER PUBLICATIONS

English language translation of form PCT/ISA/237 (mailed Mar. 17, 2020).*

(Continued)

*Primary Examiner* — Mark Kopec
(74) *Attorney, Agent, or Firm* — Birch, Stewart, Kolasch & Birch, LLP

(57) ABSTRACT

The present invention relates to a dispersant for a positive electrode of a power storage device. The dispersant is a copolymer that contains a constitutional unit A represented by the following general formula (1) and at least one constitutional unit B selected from the group consisting of a constitutional unit $B^1$ represented by the following general formula (2) and a constitutional unit $B^2$ represented by the following general formula (3). The total content of the constitutional unit A and the constitutional unit B in the copolymer is 80% by mass or more. The content of the constitutional unit A in all constitutional units of the copolymer is 35% by mass or more.

(Continued)

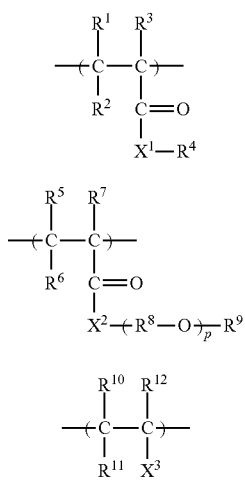

15 Claims, 1 Drawing Sheet

(51) Int. Cl.
| | |
|---|---|
| C08L 33/10 | (2006.01) |
| C08L 33/26 | (2006.01) |
| C08L 39/08 | (2006.01) |
| H01M 4/04 | (2006.01) |
| H01M 4/62 | (2006.01) |
| H01M 4/02 | (2006.01) |

(52) U.S. Cl.
CPC ......... *H01M 4/0416* (2013.01); *H01M 4/625* (2013.01); *H01M 2004/028* (2013.01)

(56) References Cited

U.S. PATENT DOCUMENTS

| | | | |
|---|---|---|---|
| 2016/0126553 A1* | 5/2016 | Murase | H01M 4/525 524/401 |
| 2018/0201797 A1 | 7/2018 | Taniguchi et al. | |
| 2018/0366731 A1 | 12/2018 | Takahashi et al. | |
| 2019/0074538 A1* | 3/2019 | Lee | H01M 4/625 |
| 2019/0190008 A1 | 6/2019 | Takizawa | |
| 2020/0295371 A1 | 9/2020 | Ishida et al. | |

FOREIGN PATENT DOCUMENTS

| | | |
|---|---|---|
| CN | 104205444 A | 12/2014 |
| JP | 1-254237 A | 10/1989 |
| JP | 2004-3087 A | 1/2004 |
| JP | 2004-281055 A | 10/2004 |
| JP | 2010-229288 A | 10/2010 |
| JP | 2012-166154 A | 9/2012 |
| JP | 2014-123495 A | 7/2014 |
| JP | 2014-135275 A | 7/2014 |
| JP | 2015-128006 A | 7/2015 |
| JP | 2015-135773 A | 7/2015 |
| JP | 2015-199623 A | 11/2015 |
| JP | 2016-177925 A | 10/2016 |
| JP | 2017-91859 A | 5/2017 |
| JP | 2017-228412 A | 12/2017 |
| JP | 6285857 B2 | 2/2018 |
| JP | 2018-142451 A | 9/2018 |
| JP | 2018-170218 A | 11/2018 |
| JP | 2018-170219 A | 11/2018 |
| JP | 2018-197341 A | 12/2018 |
| JP | 2019-46796 A | 3/2019 |
| WO | WO 2013/150778 A1 | 10/2013 |
| WO | WO 2013/151062 A1 | 10/2013 |
| WO | WO 2013/161786 A1 | 10/2013 |
| WO | WO 2017/110901 A1 | 6/2017 |
| WO | WO 2018/061622 A1 | 4/2018 |

OTHER PUBLICATIONS

Lahelin et al."In situ polymerization of methyl methacrylate/multi-walled carbon nanotube composites using cationic stearyl methacrylate copolymers as dispersants", European Polymer Journal 47 (2011) 873-881.*
Spitalsky et al."Carbon nanotube-polymer composites: Chemistry, processing, mechanical and electrical properties", Progress in Polymer Science 35 (2010) 357-401.*
Yasunaga et al "Dynamic behaviour of water in hydrogel containing hydrophobic side chains as studied by pulse HNMR", Journal of Molecular Structure 602-603 (2002) 399-404.*
Zhang et al "The effects of organic modifier on physicochemical and chromatographic characteristics of self-assembled michelle from poly(stearyl methacrylate-co-methacrylic acid) in electrokinetic chromatography", Electrophoresis 2016, 37, 2226-2234.*
International Search Report for PCT/JP2019/015908 dated Jul. 16, 2019.
International Search Report for PCT/JP2019/051591 dated Mar. 17, 2020.
U.S. Appl. No. 17/602,538, filed Oct. 8, 2021.
Chern et al., "Emulsion Polymerization of Styrene Stabilized with an Amphiphilic PEG-Containing Graft Copolymer," Macromolecular Chemistry and Physics, vol. 202, No. 13, 2001, pp. 2750-2759.
Extended European Search Report for European Application No. 19923780.1, dated Mar. 31, 2023.
Extended European Search Report for European Application No. 19924404.7, dated Dec. 8, 2022.
International Search Report (PCT/ISA/210) issued in PCT/JP2019/015909, dated Jun. 18, 2019.
International Search Report (PCT/ISA/210) issued in PCT/JP2019/051583, dated Feb. 18, 2020.
Pérez-Martínez et al., "Miniemulsion copolymerization of (meth)acrylates in the presence of functionalized multiwalled carbon nanotubes for reinforced coating applications," Beilstein Journal of Nanotechnology, vol. 8, 2017, pp. 1328-1337.

\* cited by examiner

DISPERSANT FOR POWER STORAGE DEVICE POSITIVE ELECTRODE

TECHNICAL FIELD

The present invention relates to a dispersant for a positive electrode of a power storage device, and also relates to a conductive material slurry for a battery, a positive electrode paste for a battery, and a positive electrode for a battery, each of which contains the dispersant.

BACKGROUND ART

The demand for power storage devices, in particular, lithium ion secondary batteries is steadily increasing with e.g., the recent spread of smartphones, the zero-emission controls in the automobile market, and the expanded use of natural energy. Due to the growing demand, there are many requirements for power storage devices, such as small size, light weight, high capacity, high output, and high energy density, and especially the power storage devices with improved energy density are highly demanded. In order to improve the energy density, e.g., an increase in capacity of the active materials used, compaction of electrodes, and an increase in battery voltage have been studied.

A lithium ion battery generally includes an electrode composed of a metal foil and a mixture layer containing, e.g., an active material. The mixture layer is formed on the metal foil. A paste is used for the formation of the mixture layer and includes conductive materials such as carbon black and carbon nanotubes to improve the conductive properties or reduce the resistance. Moreover, the paste may include a dispersant so that the conductive materials are efficiently dispersed and uniformly blended in the paste.

JP 2012-166154 A (Patent Document 1) discloses a carbon material dispersion containing a dispersant which is a copolymer of stearyl methacrylate and polyoxypropylene (the average number of moles added: 14) methacrylate, a carbon material such as carbon black and an organic solvent. JP H1(1989)-254237 A (Patent Document 2) discloses a copolymer as a dispersant that contains a constitutional unit derived from stearyl methacrylate and a constitutional unit derived from methoxy polyethylene glycol (the average number of moles added: 23) methacrylate. Japanese Patent No. 6285857 (Patent Document 3) discloses a positive electrode paste for a battery that contains a positive electrode active material, carbon black, a solvent, and a copolymer of e.g., stearyl methacrylate and PEG (2) MA.

Disclosure of Invention

One aspect of the present invention relates to a dispersant for a positive electrode of a power storage device. The dispersant is a copolymer that contains a constitutional unit A represented by the following general formula (1) and at least one constitutional unit B selected from the group consisting of a constitutional unit $B^1$ represented by the following general formula (2) and a constitutional unit $B^2$ represented by the following general formula (3). A total content of the constitutional unit A and the constitutional unit B in the copolymer is 80% by mass more. The content of the constitutional unit A in all constitutional units of the copolymer is 35% by mass or more:

[Chemical Formula 1]

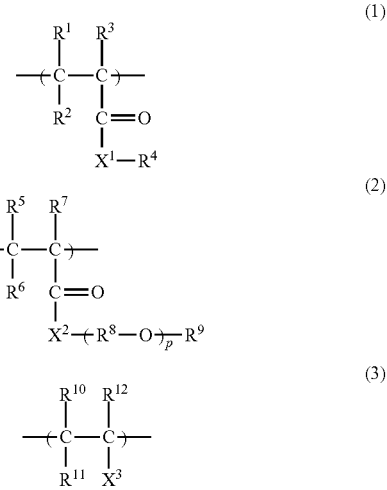

where $R^1$, $R^2$, $R^3$, $R^5$, $R^6$, $R^7$, $R^{10}$, $R^{11}$, and $R^{12}$ are the same or different and represent a hydrogen atom, a methyl group, or an ethyl group, $X^1$ represents an oxygen atom or NH, $R^4$ represents a hydrocarbon group having 16 to 30 carbon atoms, $X^2$ represents an oxygen atom, $R^8$ represents a linear or branched alkylene group having 2 to 4 carbon atoms, p represents 1, $R^9$ represents a hydrogen atom or a methyl group, and $X^3$ represents a carboxyl group, an amide group, or a pyridinyl group that may have a hydrocarbon group having 1 to 4 carbon atoms.

Another aspect of the present invention relates to a conductive material slurry for a battery. The conductive material slurry contains conductive materials, the dispersant for a positive electrode of a power storage device of the present invention, and a solvent.

Another aspect of the present invention relates to a positive electrode paste for a battery. The positive electrode paste contains a positive electrode active material, conductive materials, the dispersant for a positive electrode of a power storage device of the present invention, and a solvent.

Another aspect of the present invention relates to a method for producing a positive electrode paste for a battery. The method includes mixing the conductive material slurry for a battery of the present invention and a positive electrode active material.

Another aspect of the present invention relates to a positive electrode for a battery. The positive electrode contains the dispersant for a positive electrode of a power storage device of the present invention.

DESCRIPTION OF THE INVENTION

Figure 1:
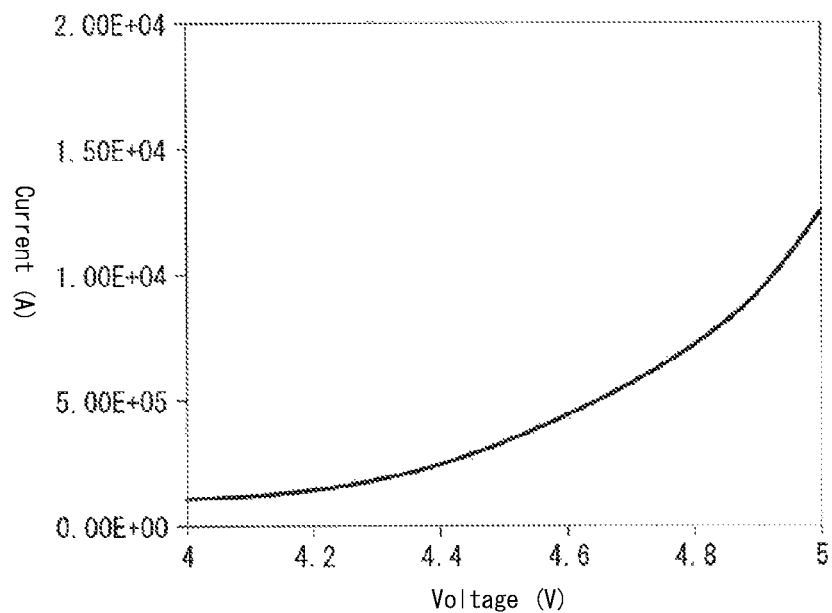
FIG. 1 shows the CV measurement results of a CV measuring electrode that is formed by using a paste for evaluating the withstand voltage performance in Comparative Example 8.

In a battery having a high voltage to improve the energy density, the dispersant, which has been used to disperse the conductive materials, can be decomposed during charge of the battery because the dispersant lacks resistance to high voltage. This may lead to, e.g., the generation of gas and thus pose a problem of degradation of the battery.

In view of the above, the present invention provides a dispersant for a positive electrode of a power storage device that is less likely to be decomposed even in a high voltage range, and also provides a conductive material slurry for a battery, a positive electrode paste for a battery, and a positive electrode for a battery, each of which contains the dispersant.

The present invention is based on the findings that when a particular copolymer is used as a dispersant for a positive electrode of a power storage device (which may also be referred to as a "dispersant" in the following) to disperse conductive materials in a positive electrode paste for a battery (which may also be referred to as a "positive electrode paste" in the following), the decomposition of the dispersant can be reduced, thereby reducing the degradation of the battery over time.

The details of the mechanism for exhibiting the effect of the present invention are still not clear, but may be assumed as follows.

As described above, the decomposition of the dispersant in a high voltage range is one of the causes of the degradation of the battery over time. The dispersant of the present invention includes a copolymer containing the constitutional unit A that is to be adsorbed on the conductive materials and the constitutional unit B that controls the solubility in a solvent. Therefore, the constitutional unit B is distributed in the solvent while the constitutional unit A is being adsorbed on the conductive materials, and a strong steric repulsive force will act between the individual conductive materials due to their steric repulsion. Thus the conductive materials can be highly dispersed in the solvent. In addition, the dispersant of the present invention has a few or no functional groups, which can be decomposed in a high voltage range. As a result, the decomposition of the dispersant is assumed to be reduced. However, the present invention is not limited to the above mechanism.

[Dispersant for Positive Electrode of Power Storage Device]

One aspect of the present invention relates to a dispersant for a positive electrode of a power storage device. The dispersant is a copolymer that contains a constitutional unit A represented by the following general formula (1) and at least one constitutional unit B selected from the group consisting of a constitutional unit $B^1$ represented by the following general formula (2) and a constitutional unit $B^2$ represented by the following general formula (3). A total content of the constitutional unit A and the constitutional unit B in the copolymer is 80% by mass or more. The content of the constitutional unit A in all the constitutional units of the copolymer is 35% by mass or more.

[Chemical Formula 2]

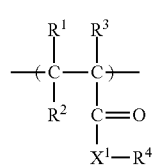
(1)

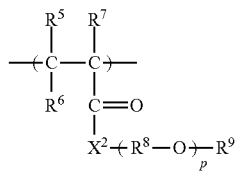
(2)

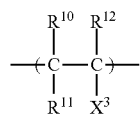
(3)

In the above formulas, $R^1$, $R^2$, $R^3$, $R^5$, $R^6$, $R^7$, $R^{10}$, $R^{11}$, and $R^{12}$ are the same or different and represent a hydrogen atom, a methyl group, or an ethyl group, $X^1$ represents an oxygen atom or NH, $R^4$ represents a hydrocarbon group having 16 to 30 carbon atoms, $X^2$ represents an oxygen atom, $R^8$ represents a linear or branched alkylene group having 2 to 4 carbon atoms p represents 1, $R^9$ represents a hydrogen atom or a methyl group, and $X^3$ represents a carboxyl group, an amide group, or a pyridinyl group that may have a hydrocarbon group having 1 to 4 carbon atoms.

The present invention can provide the dispersant for a positive electrode of a power storage device that improves the dispersibility of conductive materials and is less likely to be decomposed even in a high voltage range, and can also provide a conductive material slurry for a battery, a positive electrode paste for a battery, and a positive electrode for a battery, each of which contains the dispersant. The positive electrode paste contains the dispersant of the present invention or the conductive material slurry of the present invention. When the positive electrode paste is used to form a positive electrode mixture layer, a positive electrode for a battery can be obtained which reduces a direct current resistance and controls a decrease in battery capacity with time.

In the present invention, the feature that "a total content of the constitutional unit A and the constitutional unit B in the copolymer is 80% by mass or more" means that the sum of the content of the constitutional unit A and the content of the constitutional unit B is 80% by mass or more with respect to all the constitutional units of the copolymer. The total content (% by mass) of the constitutional unit A and the constitutional unit B with respect to all the constitutional units of the copolymer can be considered as the ratio of the amount of monomers A and B used (as will be described later) to the total amount of the monomers used for the synthesis of the copolymer.

[Constitutional Unit A]

The constitutional unit A is a component of the copolymer that is to be adsorbed on the surfaces of the conductive materials. In the general formula (1), $R^1$ and $R^2$ are preferably a hydrogen atom and $R^3$ is preferably a hydrogen atom or a methyl group, and more preferably a methyl group from the viewpoint of improving the dispersibility of the conductive materials and facilitating the introduction of the constitutional unit A into the copolymer.

In the general formula (1), $R^4$ is preferably an alkyl group or an alkenyl group from the viewpoint of improving the dispersibility of the conductive materials, reducing the decomposition of the dispersant, reducing the direct current resistance of the battery, and improving the capacity retention rate of the battery. From the same viewpoint, the carbon number of $R^4$ is 16 or more. Furthermore, from the same viewpoint, the carbon number of $R^4$ is 30 or less, preferably 24 or less, more preferably 22 or less, even more preferably 20 or less, and further preferably 18 or less. Specifically, the carbon number of $R^4$ is 16 or more and 30 or less, preferably 16 or more and 24 or less, more preferably 16 or more and 22 or less, even more preferably 16 or more and 20 or less, and further preferably 16 or more and 18 or less. More specifically, $R^4$ may be, e.g., a cetyl group, a stearyl group, an oleyl group, or a behenyl group.

In the general formula (1), $X^1$ is preferably an oxygen atom from the viewpoint of improving the dispersibility of the conductive materials and facilitating the introduction of the constitutional unit A into the copolymer.

The constitutional unit A of the general formula (1) is preferably a constitutional unit $a^1$ in which $R^1$ and $R^2$ represent a hydrogen atom, $R^3$ represents a hydrogen atom or a methyl group, $X^1$ represents an oxygen atom, and $R^4$ has 16 to 20 carbon atoms in terms of the general formula (1) from the viewpoint of improving the dispersibility of the conductive materials and facilitating the introduction of the constitutional unit A into the copolymer.

Specific examples of a monomer that forms the constitutional unit A (also referred to as a monomer A in the following) in the synthesis of the copolymer include the following: ester compounds such as palmityl (meth)acrylate, stearyl (meth)acrylate, isostearyl (meth)acrylate, and behenyl (meth)acrylate and amide compounds such as palmityl (meth)acrylamide, stearyl (meth)acrylamide, and behenyl (meth)acrylamide. In particular, from the viewpoint of improving the dispersibility of the conductive materials and facilitating the introduction of the constitutional unit A into the copolymer, the monomer A is preferably at least one selected from palmityl (meth)acrylate, stearyl (meth)acrylate, and behenyl (meth)acrylate, more preferably at least one selected from palmityl (meth)acrylate and stearyl (meth) acrylate, even more preferably at least one selected from stearyl (meth)acrylate, and further preferably stearyl methacrylate (also referred to as "SMA" in the following).

The content of the constitutional unit A in all the constitutional units of the copolymer is 35% by mass or more, preferably 38% by mass or more, and more preferably 40% by mass or more from the viewpoint of improving the dispersibility of the conductive materials, reducing the decomposition of the dispersant, reducing the direct current resistance of the battery, and improving the capacity retention rate of the battery. From the same viewpoint, the content of the constitutional unit A is preferably 90% by mass or less, more preferably 80% by mass or less, even more preferably 70% by mass or less, still more preferably 60% by mass or less, yet more preferably 55% by mass or less, and further preferably 50% by mass or less. Summarizing these viewpoints, the content of the constitutional unit A in all the constitutional units of the copolymer of the present invention is preferably 35% by mass or more and 90% by mass or less, more preferably 35% by mass or more and 80% by mass or less, even more preferably 35% by mass or more and 70% by mass or less, still more preferably 35% by mass or more and 60% by mass or less, yet more preferably 38% by mass or more and 55% by mass or less, and further preferably 40% by mass or more and 50% by mass or less. In the present invention, the content of the constitutional unit A in all the constitutional units of the copolymer can be considered as the ratio of the amount of the monomer A used to the total amount of the monomers used for polymerization.

[Constitutional Unit B]

The constitutional unit B is a component of the copolymer that controls the solubility in a solvent. The solvent is contained in the conductive material slurry for a battery (which may also be referred to as a "conductive material slurry" in the following) and the positive electrode paste for a battery (which may also be referred to as a "positive electrode paste" in the following) of the present invention, as will be described later. In the general formula (2), $R^5$ and $R^6$ are preferably a hydrogen atom and $R^7$ is preferably a hydrogen atom or a methyl group, and more preferably a methyl group from the viewpoint of improving the dispersibility of the conductive materials and facilitating the introduction of the constitutional unit B into the copolymer. Moreover, $R^9$ is preferably a hydrogen atom or a methyl group, and more preferably a hydrogen atom from the viewpoint of improving the dispersibility of the conductive materials, reducing the direct current resistance of the battery, and improving the capacity retention rate of the battery. Furthermore, $R^8$ is preferably an ethylene group or a propylene group, and more preferably an ethylene group from the viewpoint of improving the dispersibility of the conductive materials and facilitating the introduction of the constitutional unit B into the copolymer.

In the general formula (3), $R^{10}$ and $R^{11}$ are preferably a hydrogen atom, $R^{12}$ is preferably a hydrogen atom or a methyl group, and $X^3$ is preferably a pyridinyl group that may have a hydrocarbon group having 1 to 4 carbon atoms, a carboxyl group, or an amide group from the viewpoint of improving the dispersibility of the conductive materials and facilitating the introduction of the constitutional unit B into the copolymer.

From the viewpoint of improving the dispersibility of the conductive materials, the constitutional unit B is preferably at least one selected from the following constitutional units: a constitutional unit $b^{11}$ in which $R^5$ and $R^6$ represent a hydrogen atom, $R^7$ represents a hydrogen atom or a methyl group, $X^2$ represents an oxygen atom, p represents 1, $R^8$ represents an ethylene group, and $R^9$ represents a hydrogen atom in terms of the general formula (2); a constitutional unit $b^{12}$ in which $R^5$ and $R^6$ represent a hydrogen atom, $R^7$ represents a hydrogen atom or a methyl group, $X^2$ represents an oxygen atom, p represents 1, $R^8$ represents an ethylene group, and $R^9$ represents a methyl group in terms of the general formula (2); a constitutional unit $b^{21}$ in which $R^{10}$ and $R^{11}$ represent a hydrogen atom, $R^{12}$ represents a hydrogen atom or a methyl group, and $X^3$ represents a pyridinyl group that may have a hydrocarbon group having 1 to 4 carbon atoms in terms of the general formula (3); a constitutional unit $b^{22}$ in which $R^{10}$ and $R^{11}$ represent a hydrogen atom, $R^{12}$ represents a hydrogen atom or a methyl group, and $X^3$ represents COOH in terms of the general formula (3); and a constitutional unit $b^{23}$ in which $R^{10}$ and $R^{11}$ represent a hydrogen atom, $R^{12}$ represents a hydrogen atom or a methyl group, and $X^3$ represents $CONH_2$ in terms of the general formula (3).

The content of the constitutional unit B in all the constitutional units of the copolymer is preferably 5% by mass or more, more preferably 10% by mass or more, even more preferably 20% by mass or more, still more preferably 30% by mass or more, yet more preferably 35% by mass or more, and further preferably 40% by mass or more from the viewpoint of improving the dispersibility of the conductive materials, reducing the decomposition of the dispersant, reducing the direct current resistance of the battery, and improving the capacity retention rate of the battery. From the same viewpoint, the content of the constitutional unit B is preferably 65% by mass or less, and more preferably 60% by mass or less. Summarizing these viewpoints, the content of the constitutional unit B in all the constitutional units of the copolymer of the present invention is preferably 5% by mass or more and 65% by mass or less, more preferably 10% by mass or more and 65% by mass or less, even more preferably 20% by mass or more and 65% by mass or less, still more preferably 30% by mass or more and 65% by mass or less, yet more preferably 35% by mass or more and 65% by mass or less, and further preferably 40% by mass or more and 60% by mass or less. In the present invention, the content of the constitutional unit B in all the constitutional units of the copolymer can be considered as the ratio of the amount of the monomer B used to the total amount of the monomers used for polymerization.

The mass ratio of the constitutional unit B to the constitutional unit A (constitutional unit B/constitutional unit A) of the copolymer is preferably 0.2 or more, more preferably 0.3 or more, even more preferably 0.5 more, still more preferably 0.6 or more, yet more preferably 0.7 or more, and further preferably 0.8 or more from the viewpoint of improving the dispersibility of the conductive materials, reducing the decomposition of the dispersant, reducing the direct current resistance of the battery, and improving the capacity retention rate of the battery. From the same viewpoint, the mass ratio of the constitutional unit B to the constitutional unit A is preferably 1.9 or less, more preferably 1.85 or less, even more preferably 1.8 or less, still more preferably 1.7 or less, yet more preferably 1.6 or less, and further preferably 1.5 or less. Summarizing these viewpoints, the mass ratio (constitutional unit B/constitutional unit A) is preferably 0.2 or more and 1.9 or less, more preferably 0.2 or more and 1.85 or less, even more preferably 0.2 more and 1.8 or less, still more preferably 0.3 or more and 1.8 or less, yet more preferably 0.5 or more and 1.7 or less, further preferably 0.6 or more and 1.6 or less, even further preferably 0.7 or more and 1.6 or less, and still further preferably 0.8 or more and 1.5 or less. In the present invention, the mass ratio (constitutional unit B/constitutional unit A) can be considered as the mass ratio of the monomer B to the monomer A used for the polymerization of the copolymer.

The constitutional unit B may have a structure derived from a nonionic monomer or a structure in which a nonionic group is introduced after polymerization.

Examples of a monomer that forms the constitutional unit B (also referred to as a monomer B in the following) in the synthesis of the copolymer include the following: 2-hydroxyethyl (meth)acrylate, 2-methoxyethyl (meth)acrylate, 2-methoxypropyl (meth)acrylate, 2-hydroxypropyl (meth)acrylate, 2-ethoxyethyl (meth)acrylate, 2-ethoxypropyl (meth)acrylate, 2-methoxyethyl (meth)acrylamide, 2-ethoxyethyl (meth)acrylamide, 2-methoxypropyl (meth)acrylamide, 4-vinylpyridine, 2-vinylpyridine, (meth)acrylic acid, and (meth)acrylamide. In particular, from the viewpoint of improving the dispersibility of the conductive materials, reducing the decomposition of the dispersant, reducing the direct current resistance of the battery, and improving the capacity retention rate of the battery, the monomer B is preferably at least one selected from 2-hydroxyethyl (meth)acrylate, 2-methoxyethyl (meth)acrylate, 4-vinylpyridine, (meth)acrylic acid, and (meth)acrylamide, and more preferably at least one selected from 2-hydroxyethyl methacrylate (also referred to as "HEMA" in the following), methoxyethyl methacrylate (also referred to as "PEGMA (EO1)" in the following), 4-vinylpyridine (also referred to as "4-VPy" in the following), methacrylic acid (also referred to as "MAA" in the following), and methacrylamide (also referred to as "MAAm" in the following).

The sum of the content of the constitutional unit A and the content of the constitutional unit B is 80% by mass or more, preferably 90% by mass or more, more preferably 95% by mass or more, even more preferably 98% by mass or more, and further preferably 100% by mass with respect to all the constitutional units of the copolymer from the viewpoint of improving the dispersibility of the conductive materials, reducing the decomposition of the dispersant, reducing the direct current resistance of the battery, and improving the capacity retention rate of the battery.

[Constitutional Unit C]

When the copolymer contains a constitutional unit C having an alkylene oxide chain with an average number of moles added of 2 moles or more, the content of the constitutional unit C should be 10% by mass or less. From the viewpoint of improving the dispersibility of the conductive materials, reducing the decomposition of the dispersant, reducing the direct current resistance of the battery, and improving the capacity retention rate of the battery, the content of the constitutional unit C is preferably 7% by mass or less, more preferably 5% by mass or less, even more preferably substantially 0% by mass or less, and further preferably 0% by mass.

The copolymer may contain, e.g., a constitutional unit represented by the following general formula (4) as the constitutional unit C.

[Chemical Formula 3]

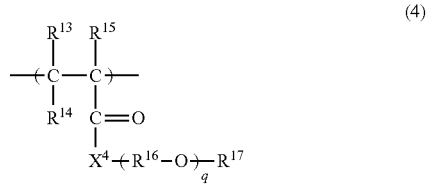

$$(4)$$

In the above formula, $R^{13}$, $R^{14}$, and $R^{15}$ are the same or different and represent a hydrogen atom, a methyl group, or an ethyl group, $R^{16}$ represents a linear or branched alkylene group having 2 to 4 carbon atoms, $X^4$ represents an oxygen atom, q represents 2 or more, and $R^{17}$ represents a hydrogen atom or a hydrocarbon group.

From the viewpoint of improving the dispersibility of the conductive materials and facilitating the introduction of the constitutional unit C into the copolymer, $R^{13}$ and $R^{14}$ are preferably a hydrogen atom, $R^{15}$ is preferably a hydrogen atom or a methyl group, and $R^{17}$ is preferably a hydrogen atom or a methyl group, and more preferably a hydrogen atom. From the viewpoint of improving the dispersibility of the conductive materials and facilitating the introduction of the constitutional unit C into the copolymer, $R^{16}$ is preferably an ethylene group or a propylene group, and more preferably an ethylene group.

Moreover, from the viewpoint of improving the dispersibility of the conductive materials, reducing the decomposition of the dispersant, reducing the direct current resistance of the battery, and improving the capacity retention rate of the battery, q is 2 or more, preferably 50 or less, more preferably 2 or more and 23 or less, even more preferably 2 or more and 10 or less, and further preferably 2 or more and 5 or less.

The constitutional unit C is preferably a constitutional unit in which $R^{13}$ and $R^{14}$ represent a hydrogen atom, $R^{15}$ represents a hydrogen atom or a methyl group, $R^{16}$ represents an ethylene group, $R^{17}$ represents a hydrogen atom or a methyl group, and q represents 2 or more and 10 or less, and more preferably a constitutional unit in which $R^{13}$ and $R^{14}$ represent a hydrogen atom, $R^{15}$ represents a methyl group, $R^{16}$ represents an ethylene group, $R^{17}$ represents a hydrogen atom or a methyl group, and q represents 2 or more and 10 or less from the viewpoint of improving the dispersibility of the conductive materials, reducing the decomposition of the dispersant, reducing the direct current resistance of the battery, and improving the capacity retention rate of the battery.

From the viewpoint of improving the dispersibility of the conductive materials, reducing the decomposition of the dispersant, reducing the direct current resistance of the battery, and improving the capacity retention rate of the battery, examples of a monomer that forms the constitutional unit C (also referred to as a monomer C in the following) in the synthesis of the copolymer include the following: methoxy polyethylene glycol methacrylate (where the average number of moles of ethylene oxide added is 9) (also referred to as "PEGMA (EO9)" in the following); and methoxy polyethylene glycol methacrylate (where the average number of moles of ethylene oxide added is 2) (also referred to as "PEGMA (EO2)" in the following).

The proportion of the constitutional unit represented by the general formula (4) in the constitutional unit C having an alkylene oxide chain with an average number of moles added of 2 moles or more is preferably 50% by mass or more, more preferably 80% by mass or more and is also preferably 100% by mass or less. When the monomer that forms the constitutional unit C and is used for the polymerization of the copolymer is referred to as a monomer C, and the monomer that forms the constitutional unit represented by the general formula (4) and is used for the polymerization of the copolymer is referred to as a monomer C1, the proportion (% by mass) of the constitutional unit represented by the general formula (4) in all the constitutional units of the constitutional unit C can be considered as the ratio of the monomer C1 to the total amount of the monomer C.

The copolymer is preferably at least one selected from the following copolymers from the viewpoint of improving the dispersibility of the conductive materials.

Copolymer of SMA and PEGMA (EO1)
Copolymer of SMA and HEMA
Copolymer of SMA, PEGMA (EO1) and HEMA
Copolymer of SMA and 4-VPy
Copolymer of SMA and MAA
Copolymer of SMA, PEGMA (EO1) and 4-VPy
Copolymer of SMA, PEGMA (EO1) and MAA
Copolymer of SMA, PEGMA (EO1) and MAAm
Copolymer of SMA HEMA and 4-VPy
Copolymer of SMA, HEMA and MAA
Copolymer of SMA, HEMA and MAAm
Copolymer of SMA, MAA and 4-VPy
Copolymer of SMA, PEGMA (EO1) and PEGMA (EO9)
Copolymer of SMA, HEMA and PEGMA (EO2)

The weight average molecular weight of the copolymer is preferably 1,000 or more, more preferably 5,000 or more, even more preferably 10,000 or more, still more preferably 20,000 or more, and further preferably 30,000 or more from the viewpoint of improving the dispersibility of the conductive materials and improving the capacity retention rate of the battery. From the same viewpoint, the weight average molecular weight of the copolymer is preferably 500,000 or less, more preferably 200,000 or less, even more preferably 120,000 or less, and further preferably 100,000 or less. Specifically, the weight average molecular weight of the copolymer is preferably 1,000 to 500,000, more preferably 5,000 to 200,000, even more preferably 10,000 to 120,000, still more preferably 20,000 to 120,000, and further preferably 30,000 to 100,000. The weight average molecular weight is a value measured by GPC (gel permeation chromatography) and the details of the measurement conditions will be described in Examples.

The synthesis method of the copolymer is not particularly limited and can be a method that is generally used for the polymerization of (meth)acrylic acid esters. Examples of the synthesis method include a free radical polymerization method, a living radical polymerization method, an anionic polymerization method, and a living anionic polymerization method. For example, when the free radical polymerization method is used, monomer components containing the monomer A and the monomer B may be polymerized by a known method such as a solution polymerization method.

The solvent used for the solution polymerization may be an organic solvent. Examples of the organic solvent include the following; hydrocarbons (hexane and heptane); aromatic hydrocarbons (toluene, xylene, etc.); lower alcohols (ethanol, isopropanol, etc.); ketones (acetone, methyl ethyl ketone, etc.); ethers (tetrahydrofuran, diethylene glycol dimethyl ether, etc.); and N-methyl-2-pyrrolidone. Among them, N-methyl-2-pyrrolidone is preferred because it is to be used with the conductive materials in the positive electrode for a battery. The amount of the solvent is preferably 0.5 to 10 times the total amount of the monomers (mass ratio).

A known radical polymerization initiator may be used as a polymerization initiator. Examples of the polymerization initiator include azo polymerization initiators, hydroperoxides, dialkyl peroxides, diacyl peroxides, and ketone peroxides. The amount of the polymerization initiator is preferably 0.01 to 5 mol % with respect to the total amount of the monomer components. The polymerization reaction is preferably performed at a temperature of 60 to 180° C. under a nitrogen flow, and the reaction time is preferably 0.5 to 20 hours.

Moreover, a known chain transfer agent may be used to adjust the molecular weight. Examples of the chain transfer agent include isopropyl alcohol and mercapto compounds such as mercaptoethanol.

The arrangement of the constitutional unit A and the constitutional unit B in the copolymer can take any form such as random, block, or graft. The copolymer may contain constitutional units other than these constitutional units.

[Conductive Material Slurry for Battery]

One aspect of the present invention relates to a conductive material slurry for a battery produced by using the dispersant of the present invention. The conductive material slurry contains conductive materials, the dispersant, and a solvent.

[Conductive Materials]

The conductive materials are conductive carbon materials. The conductive materials serve to efficiently perform a charge-discharge reaction and improve the electrical conductivity. Examples of the conductive materials include carbon materials such as graphite, furnace black, acetylene black, Ketjen black, carbon nanotubes (CNTs), and graphene. These carbon materials may be used individually or in combination of two or more. From the viewpoint of low resistance, acetylene black, CNTs, and graphene are preferred.

When the conductive materials include CNTs, the CNTs may have various number of layers, diameters, or lengths. The CNTs are classified into single-walled CNTs (SWCNTs), double-walled CNTs (DWCNTs), and multiwalled CNTs (MWCNTs). Any of the single-, double-, and multi-walled CNTs and a mixture of them can be used depending on the properties required for the positive electrode to be obtained. From the viewpoint of the dispersion performance and availability of the CNTs, the multi-walled CNTs are preferably used.

The average diameter of the CNTs is measured by a scanning electron microscope (SEM) or an atomic force microscope (AFM). In the present invention, the average diameter of the CNTs is not particularly limited and is preferably 1 nm or more, more preferably 3 nm or more, even more preferably 5 nm or more, and further preferably 8 nm or more from the viewpoint of improving the dispersibility of the CNTs. Furthermore, the average diameter of the CNTs is preferably 100 nm or less, more preferably 50 nm or less, even more preferably 30 nm or less, still more preferably 20 nm or less, and further preferably 15 nm or less from the viewpoint of improving the conductive properties. Specifically, the average diameter of the CNTs is preferably 1 nm or more and 100 nm or less, more preferably 3 nm or more and 50 nm or less, even more preferably 5 nm or more and 30 nm or less, still more preferably 5 nm or more and 20 nm or less, and further preferably 8 nm or more and 15 nm or less.

The average length of the CNTs is measured by a scanning electron microscope (SEM) or an atomic force microscope (AFM). In the present invention, the average length of the CNTs is not particularly limited and is preferably 1 μm or more from the viewpoint of improving the conductive properties. Furthermore, the average length of the CNTs is preferably 500 μm or less, more preferably 300 μm or less, even more preferably 200 μm or less, and further preferably 100 μm or less from the viewpoint of improving the dispersibility of the CNTs. Specifically, the average length of the CNTs is preferably 1 μm or more and 500 μm or less, more preferably 1 μm or more and 300 μm or less, even more preferably 1 μm or more and 200 μm or less, and further preferably 1 μm or more and 100 μm or less.

The content of the conductive materials in the conductive material slurry of the present invention varies depending on the type of the conductive materials, but is preferably 1% by mass or more, and more preferably 3% by mass or more from the viewpoint of workability and blending properties. From the same viewpoint, the content of the conductive materials is preferably 50% by mass or less, more preferably 30% by mass or less, and further preferably 10% by mass or less.

When the conductive materials include acetylene black, the content of the conductive materials in the conductive material slurry of the present invention is preferably 3% by mass or more, and more preferably 5% by mass or more from the viewpoint of workability and blending properties. From the same viewpoint, the content of the conductive materials is preferably 40% by mass or less, more preferably 30% by mass or less, even more preferably 20% by mass or less, and further preferably 10% by mass or less.

When the conductive materials include multi-walled CNTs with an average diameter of about 10 nm, the content of the conductive materials in the conductive material slurry of the present invention is preferably 1% by mass or more, and more preferably 3% by mass or more from the viewpoint of workability and blending properties. From the same viewpoint, the content of the conductive materials is preferably 15% by mass or less, more preferably 10% by mass or less, and further preferably 5% by mass or less.

[Content of Dispersant]

The content of the dispersant in the conductive material slurry of the present invention is preferably 1 part by mass or more, more preferably 2 parts by mass or more, and further preferably 5 parts by mass or more with respect to 100 parts by mass of the conductive materials from the viewpoint of dispersibility and battery performance. From the same viewpoint, the content of the dispersant is preferably 50 parts by mass or less, more preferably 30 parts by mass or less, and further preferably 20 parts by mass or less with respect to 100 parts by mass of the conductive materials.

When the conductive materials include acetylene black, the content of the dispersant in the conductive material slurry of the present invention is preferably 1 part by mass or more, more preferably 2 parts by mass or more, and further preferably 5 parts by mass or more with respect to 100 parts by mass of the conductive materials from the viewpoint of dispersibility and battery performance. From the same viewpoint, the content of the dispersant is preferably 30 parts by mass or less, and more preferably 20 parts by mass or less with respect to 100 parts by mass of the conductive materials.

When the conductive materials include multi-walled CNTs with an average diameter of about 10 nm, the content of the dispersant in the conductive material slurry of the present invention is preferably 5 parts by mass or more, and more preferably 10 parts by mass or more with respect to 100 parts by mass of the conductive materials from the viewpoint of dispersibility and battery performance. From the same viewpoint, the content of the dispersant is preferably 50 parts by mass or less, and more preferably 30 parts by mass or less with respect to 100 parts by mass of the conductive materials.

[Solvent]

The solvent contained in the conductive material slurry of the present invention preferably can dissolve the dispersant, can serve as a dispersion medium for dispersing the conductive materials, and also can dissolve a binder that is used to prepare a positive electrode paste. The preferred solvent may be, e.g., N-methyl-2-pyrrolidone.

The content of the solvent in the conductive material slurry of the present invention is preferably 50% by mass or more, and more preferably 70% by mass or more from the viewpoint of workability and ease of blending composition. From the same viewpoint, the content of the solvent is preferably 99.5% by mass or less, more preferably 99% by mass or less, and further preferably 97% by mass or less.

The conductive material slurry of the present invention may further contain optional components to the extent that they do not interfere with the effect of the present invention. The optional components may be, e.g., at least one selected from a surfactant, a thickening agent, an antifoaming agent, and a neutralizing agent. The conductive material slurry of the present invention may contain at least a part of the binder to be contained in the positive electrode paste as an optional component.

The viscosity of the conductive material slurry of the present invention, measured at 25° C. with an E-type viscometer, is preferably 1000 mPa·s or less, and more preferably 100 mPa·s or less from the viewpoint of workability.

The method for producing the conductive material slurry of the present invention may include blending, e.g., the conductive materials, the dispersant, the solvent, and optionally the above optional components by a known method, and dispersing the mixture with a mixing and dispersing machine or the like. The mixing and dispersing machine may be at least one selected from, e.g., an ultrasonic homogenizer, a vibration mill, a jet mill, a ball mill, a bead mill, a sand mill, a roll mill, a homogenizer, a high-pressure homogenizer, an ultrasonic device, an attritor, a dissolver, and a paint shaker.

[Positive Electrode Paste for Battery]

One aspect of the present invention relates to a positive electrode paste for a battery produced by using the dispersant of the present invention. The positive electrode paste contains a positive electrode active material, conductive materials, a binder, the dispersant of the present invention, and a solvent.

[Positive Electrode Active Material]

The positive electrode active material may be any active material that is capable of intercalating and deintercalating lithium and is capable of undergoing a charge-discharge reaction. Examples of the positive electrode active material include lithium metal composite oxides such as $LiCoO_2$, $LiNiO_2$, $LiMn_2O_4$, ternary system (NMC system) $LiNi_xM-n_yCo_zO_2$, Li-rich type $(Li(Li_xMe_{1-x})O_2(Me=Co, Ni, Mn,$ etc.)), and Ni-rich type $(LiNi_xCo_yAl_zO_2)$. In these compounds, elements may be partially substituted. In particular, the present invention can be effective when using a high-potential positive electrode active material such as $LiCoO_2$ or 5V spinel (general formula: $Li_aNi_xMn_yM_zO_4$). The positive electrode active material may be a granular material. The average particle size of the granular material may be, e.g., 1 μm or more and 40 μm or less.

The content of the positive electrode active material in the positive electrode paste of the present invention is preferably 80% by mass or more, more preferably 85% by mass or more, and further preferably 90% by mass or more with respect to the total solid content of the positive electrode paste from the viewpoint of high capacity. Furthermore, the content of the positive electrode active material is preferably 99.5% by mass or less, more preferably 99% by mass or less, and further preferably 95% by mass or less with respect to the total solid content of the positive electrode paste from the viewpoint of improving the binding strength of a positive electrode mixture layer to a current collector.

[Content of Conductive Materials]

The type of the conductive materials contained in the positive electrode paste of the present invention may be the same as that of the conductive materials contained in the conductive material slurry of the present invention. The content of the conductive materials in the positive electrode paste of the present invention is preferably 0.05% by mass or more, more preferably 0.5% by mass or more, and further preferably 1% by mass or more with respect to the total solid content of the positive electrode paste from the viewpoint of improving the conductive properties. Furthermore, the content of the conductive materials is preferably 10% by mass or less, and more preferably 5% by mass or less with respect to the total solid content of the positive electrode paste from the viewpoint of increasing the battery capacity.

[Binder]

The binder provides an adhesive function between the positive electrode mixture layer and the current collector, and is also called a binding agent. For example, polyvinylidene fluoride (PVDF) is generally used.

The content of the binder in the positive electrode paste of the present invention is preferably 0.2% by mass or more, more preferably 0.5% by mass or more, and further preferably 1% by mass or more with respect to the total solid content of the positive electrode paste from the viewpoint of improving the binding strength of the positive electrode mixture layer to the current collector. Furthermore, the content of the binder is preferably 10% by mass or less, and more preferably 5% by mass or less with respect to the total solid content of the positive electrode paste from the viewpoint of increasing the battery capacity.

[Content of Dispersant]

The mass ratio of the dispersant (copolymer) to the conductive materials (copolymer/conductive materials) of the present invention is preferably 0.005 or more, more preferably 0.02 or more, and further preferably 0.05 or more from the viewpoint of improving the dispersibility of the conductive materials. Furthermore, the mass ratio of the dispersant (copolymer) to the conductive materials is preferably 1 or less, more preferably 0.5 or less, and further preferably 0.3 or less from the viewpoint of maintaining the battery output. Specifically, the mass ratio (copolymer/conductive materials) is preferably 0.005 or more and 1 or less, more preferably 0.02 or more and 0.5 or less, and further preferably 0.05 or more and 0.3 or less.

[Solvent]

The solvent contained in the positive electrode paste of the present invention can serve as a dispersion medium for dispersing the positive electrode active material and the conductive materials, and also can dissolve the binder and the dispersant. The preferred solvent may be, e.g., N-methyl-2-pyrrolidone.

The content of the solvent in the positive electrode paste of the present invention is preferably 10% by weight or more, and more preferably 15% by weight or more from the viewpoint of improving the matability of the positive electrode paste. From the same viewpoint, the content of the solvent is preferably 50% by weight or less, and more preferably 40% by weight or less.

[Optional Components]

The positive electrode paste of the present invention may further contain optional components to the extent that they do not interfere with the effect of the present invention, in addition to the positive electrode active material, the conductive materials, the binder, the dispersant of the present invention, and the solvent. The optional components may be, e.g., at least one selected from a surfactant, a thickening agent, an antifoaming agent, and a neutralizing agent.

[Production Method of Positive Electrode Paste]

One embodiment of the present invention relates to a method for producing a positive electrode paste of the present invention.

The method for producing a positive electrode paste of the present invention includes mixing a positive electrode active material, conductive materials, a binder, the dispersant of the present invention, and a solvent. These components may be mixed in any order. In a preferred step, the conductive materials, the dispersant, and the solvent are mixed and dispersed until the mixture becomes homogeneous. Then, this mixture is blended with the positive electrode active material, the binder, and the residual solvent, and stirred until they become homogeneous. Thus, the positive electrode paste is obtained. In another preferred step, the positive electrode active material and the conductive material slurry, and optionally the solvent, are mixed and stirred until the mixture becomes homogeneous. Then, this mixture is blended with the binder and the residual solvent, and stirred until they become homogeneous. Thus the positive electrode paste is obtained. Each step may use any means of mixing and stirring the components. For example, a self-rotating stirrer can be used.

[Electrode for Battery and Production Method Thereof]

One embodiment of the present invention relates to an electrode for a battery (also referred to as an "electrode of the present invention" in the following) that includes a positive electrode mixture layer produced by using the positive electrode paste of the present invention. Therefore, the electrode of the present invention includes the dispersant of the present invention. The electrode of the present invention can be produced by a known production method of an electrode, except for the use of the positive electrode paste of the present invention. For example, the positive electrode paste of the present invention is applied to a current collector and dried. Then, this current collector is pressed as needed and processed to a predetermined size, so that the electrode of the present invention can be obtained. The current collector may be a conventionally known current collector such as an aluminum foil. The positive electrode paste may be applied with, e.g., a die head, a comma reverse roll, a direct roll, or a gravure roll. The drying process of the positive electrode paste after coating can be performed by, e.g., heating, airflow, or infrared radiation, which may be used individually or in combination of two or more. The positive electrode can be pressed by, e.g., a roll press machine.

[Battery]

One embodiment of the present invention relates to a battery including the electrode of the present invention (also referred to as a "battery of the present invention" in the following). The battery includes the positive electrode produced by the above production method and may be, e.g., a lithium ion battery, a sodium ion battery, or an all-solid-state battery.

The battery of the present invention may be in any form of coin, cylinder, square, film, layered laminate, etc.

The battery of the present invention can be produced by a known production method of a battery, except for the use of the electrode of the present invention. For example, one embodiment of the production method of a lithium ion battery may include the following steps: stacking the electrode (positive electrode) of the present invention and a negative electrode with a separator interposed between them; winding or laminating this layered body so as to correspond to the shape of a battery; placing the wound or laminated body in a battery container or laminated container; putting an electrolyte solution into the container; and sealing the container.

In one embodiment, the separator is a member having the functions of e.g., insulating the positive electrode from the negative electrode and further holding the electrolyte solution. The separator may be a thin microporous membrane of, e.g., polyethylene, polypropylene, polyester, polyimide, cellulose, or a laminated product thereof.

The electrolyte solution is generally a solution in which electrolyte is dissolved in an organic solvent. Examples of the organic solvent include the following: cyclic carbonates such as ethylene carbonate and propylene carbonate; chain carbonates such as diethyl carbonate, dimethyl carbonate, and methyl ethyl carbonate; chain and cyclic esters; and ionic liquids. These organic solvents may be used individually or in combination of two or more. The electrolyte is an ionic compound that is dissolved in the organic solvent and has the function of conducting electricity. In the lithium ion battery, the electrolyte may be, e.g., lithium salts such as $LiClO_4$, $LiPF_6$, $LiBF_4$, $LiCF_3SO_3$, $LiN(CF_3SO_2)_2$, $LiCF_3CO_2$, LiCl, LiBr, and LiSCN. These lithium salts may be used individually or in combination of two or more.

Concerning the above embodiments, the present invention further discloses the following conductive material slurry and positive electrode paste for a battery.

<1> A conductive material slurry for a battery containing conductive materials, a copolymer that contains a constitutional unit A represented by the following general formula (1) and at least one constitutional unit B selected from the group consisting of a constitutional unit $B^1$ represented by the following general formula (2) and a constitutional unit $B^2$ represented by the following general formula (3), and a solvent, wherein a total content of the constitutional unit A and the constitutional unit B in the copolymer is 80% by mass or more, and the content of the constitutional unit A in all constitutional units of the copolymer is 35% by mass or more:

[Chemical Formula 4]

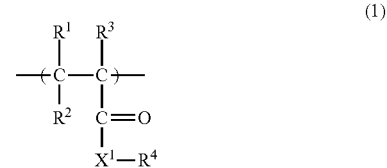

(1)

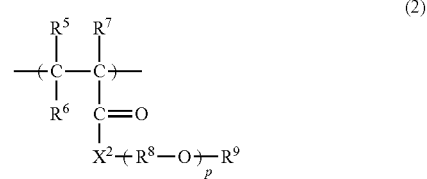

(2)

(3)

where $R^1$, $R^2$, $R^3$, $R^5$, $R^6$, $R^7$, $R^{10}$, $R^{11}$, and $R^{12}$ are the same or different and represent a hydrogen atom, a methyl group, or an ethyl group, $X^1$ represents an oxygen atom or NH, $R^4$ represents a hydrocarbon group having 16 to 30 carbon atoms, $X^2$ represents an oxygen atom, $R^8$ represents a linear or branched alkylene group having 2 to 4 carbon atoms, p represents 1, $R^9$ represents a hydrogen atom or a methyl group, and $X^3$ represents a carboxyl group, an amide group, or a pyridinyl group that may have a hydrocarbon group having 1 to 4 carbon atoms.

<2> A conductive material slurry for a battery containing conductive materials, a copolymer that contains a constitutional unit A represented by the following general formula (1) and at least one constitutional unit B selected from the group consisting of a constitutional unit $B^1$ represented by the following general formula (2) and a constitutional unit $B^2$ represented by the following general formula (3), and a solvent, wherein a total content of the constitutional unit A and the constitutional unit B in the copolymer is 80% by mass or more, the content of the constitutional unit A in all constitutional units of the copolymer is 35% by mass or more and 80% by mass or less, and the content of the constitutional unit B in all the constitutional units of the copolymer is 5% by mass or more and 65% by mass or less:

[Chemical Formula 5]

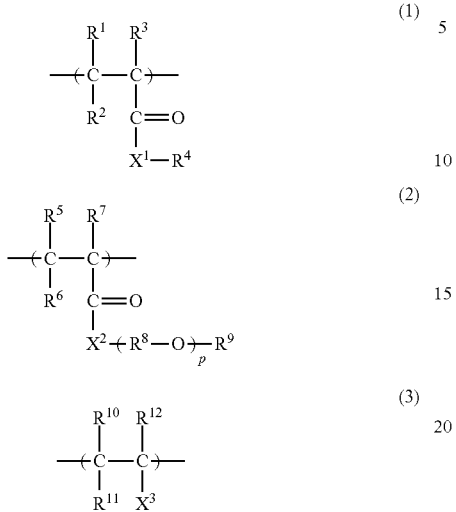

where $R^1$, $R^2$, $R^5$, $R^6$, $R^{10}$, and $R^{11}$ represent hydrogen, $R^3$, $R^7$, and $R^{12}$ are the same or different and represent a hydrogen atom or a methyl group, $X^1$ represents an oxygen atom, $R^4$ represents a hydrocarbon group having 16 to 22 carbon atoms $X^2$ represents an oxygen atom, $R^8$ represents an ethylene group or a propylene group, p represents 1, $R^9$ represents a hydrogen atom or a methyl group, and $X^3$ represents a carboxyl group, an amide group, or a pyridinyl group that may have a hydrocarbon group having 1 to 4 carbon atoms.

<3> A conductive material slurry for a battery containing conductive materials, a copolymer that contains a constitutional unit A represented by the following general formula (1) and at least one constitutional unit B selected from the group consisting of a constitutional unit $B^1$ represented by the following general formula (2) and a constitutional unit $B^2$ represented by the following general formula (3), and a solvent, wherein a total content of the constitutional unit A and the constitutional unit B in the copolymer is 80% by mass or more, the content of the constitutional unit A in all constitutional units of the copolymer is 35% by mass or more and 80% by mass or less, the content of the constitutional unit B in all the constitutional units of the copolymer is 5% by mass or more and 65% by mass or less, and a ratio of the content of the constitutional unit B to the content of the constitutional unit A (constitutional unit B/constitutional unit A) of the copolymer is 0.2 or more and 1.8 or less:

[Chemical Formula 6]

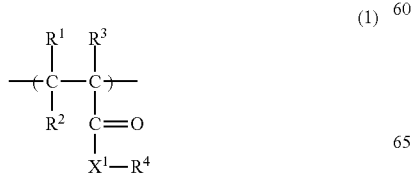

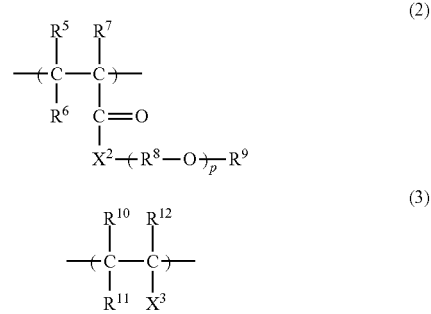

where $R^1$, $R^2$, $R^5$, $R^6$, $R^{10}$, and $R^{11}$ represent hydrogen, $R^3$, $R^7$, and $R^{12}$ are the same or different and represent a hydrogen atom or a methyl group, $X^1$ represents an oxygen atom, $R^4$ represents a hydrocarbon group having 16 to 22 carbon atoms $X^2$ represents an oxygen atom, $R^8$ represents an ethylene group or a propylene group, p represents 1, $R^9$ represents a hydrogen atom or a methyl group, and $X^3$ represents a carboxyl group, an amide group, or a pyridinyl group that may have a hydrocarbon group having 1 to 4 carbon atoms.

<4> A conductive material slurry for a battery containing conductive materials, a copolymer that contains a constitutional unit A represented by the following general formula (1) and at least one constitutional unit B selected from the group consisting of a constitutional unit $B^1$ represented by the following general formula (2) and a constitutional unit $B^2$ represented by the following general formula (3), and a solvent, wherein a total content of the constitutional unit A and the constitutional unit B in the copolymer is 80% by mass or more, the content of the constitutional unit A in all constitutional units of the copolymer is 35% by mass or more and 70% by mass or less, the content of the constitutional unit B in all the constitutional units of the copolymer is 20% by mass or more and 65% by mass or less, and a ratio of the content of the constitutional unit B to the content of the constitutional unit A (constitutional unit B/constitutional unit A) of the copolymer is 0.5 or more and 1.7 or less:

[Chemical Formula 7]

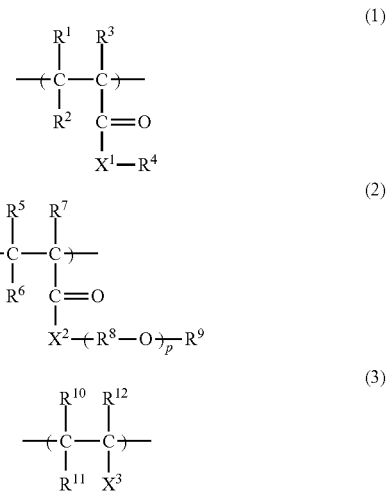

where $R^1$, $R^2$, $R^5$, $R^6$, $R^{10}$, and $R^{11}$ represent hydrogen, $R^3$, $R^7$, and $R^{12}$ are the same or different and represent a hydrogen atom or a methyl group, $X^1$ represents an oxygen atom, $R^4$ represents a hydrocarbon group having 16 to 20 carbon atoms, $X^2$ represents an oxygen atom, $R^8$ represents an ethylene group, p represents 1, $R^9$ represents a hydrogen atom or a methyl group, and $X^3$ represents a carboxyl group, an amide group, or a pyridinyl group that may have a hydrocarbon group having 1 to 4 carbon atoms.

<5> A conductive material slurry for a battery containing conductive materials, a copolymer that contains a constitutional unit A represented by the following general formula (1) and at least one constitutional unit B selected from the group consisting of a constitutional unit $B^1$ represented by the following general formula (2) and a constitutional unit $B^2$ represented by the following general formula (3), and a solvent, wherein a total content of the constitutional unit A and the constitutional unit B in the copolymer is 80% by mass or more, the content of the constitutional unit A in all constitutional units of the copolymer is 35% by mass or more and 60% by mass or less, the content of the constitutional unit B in all the constitutional units of the copolymer is 30% by mass or more and 65% by mass or less, and a ratio of the content of the constitutional unit B to the content of the constitutional unit A (constitutional unit B/constitutional unit A) of the copolymer is 0.6 or more and 1.6 or less:

[Chemical Formula 8]

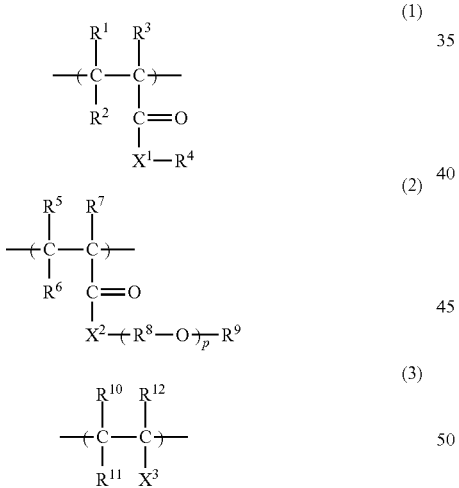

where $R^1$, $R^2$, $R^5$, $R^6$, $R^{10}$, and $R^{11}$ represent hydrogen, $R^3$, $R^7$, and $R^{12}$ are the same or different and represent a hydrogen atom or a methyl group, $X^1$ represents an oxygen atom, $R^4$ represents a hydrocarbon group having 16 to 20 carbon atoms, $X^2$ represents an oxygen atom, $R^8$ represents an ethylene group, p represents 1, $R^9$ represents a hydrogen atom or a methyl group, and $X^3$ represents a carboxyl group, an amide group, or a pyridinyl group that may have a hydrocarbon group having 1 to 4 carbon atoms.

<6> The conductive material slurry for a battery according to any one of <1> to <5>, wherein the copolymer further contains a constitutional unit C represented by the following general formula (4):

[Chemical Formula 9]

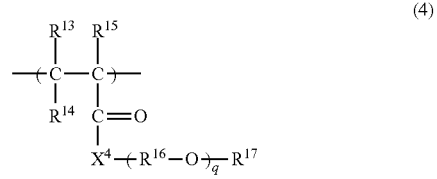

where $R^{13}$ and $R^{14}$ represent a hydrogen atom, $R^{15}$ and $R^{17}$ are the same or different and represent a hydrogen atom or a methyl group, $R^{16}$ represents an ethylene group or a propylene group, $X^4$ represents an oxygen atom, and q represents an integer of 2 or more and 10 or less.

<7> The conductive material slurry for a battery according to any one of <1> to <6>, wherein a weight average molecular weight of the copolymer is 5,000 or more and 200,000 or less.

<8> The conductive material slurry for a battery according to any one of <1> to <7>, wherein the conductive materials include carbon nanotubes.

<9> The conductive material slurry for a battery according to any one of <1> to <7>, wherein the conductive materials include acetylene black.

<10> The conductive material slurry for a battery according to any one of <1> to <9>, wherein a content of the conductive materials is 1% by mass or more and 10% by mass or less.

<11> The conductive material slurry for a battery according to any one of <1> to <10>, wherein a content of the copolymer is 5 parts by mass or more and 30 parts by mass or less with respect to 100 parts by mass of the conductive materials.

<12> The conductive material slurry for a battery according to any one of <1> to <11>, wherein the solvent is N-methyl-2-pyrrolidone.

<13> A Positive electrode paste for a battery containing the conductive material slurry according to any one of <1> to <12> and a positive electrode active material.

EXAMPLES

Hereinafter, Examples and Comparative Examples of the present invention will be described, but the present invention is not limited to the following examples.

[Measurement of Non-Volatile Content]

The non-volatile content of a copolymer solution was measured as follows.

First, 10 g of dried anhydrous sodium sulfate and a glass rod were placed in a petri dish, and their total mass was measured and taken as W3 (g). Further, 2 g of an NMP solution of a copolymer, as a sample, was added to the petri dish, and their total mass was measured and taken as W1 (g). The dried anhydrous sodium sulfate and the sample were mixed with the glass rod in the petri dish. Then, the entire petri dish was dried in a vacuum dryer at 140° C. (under a nitrogen flow with a pressure of 40 kPa) for 12 hours, while the glass rod and the mixture of the dried anhydrous sodium sulfate and the sample were kept in the petri dish. The mass of the entire petri dish after drying was measured and taken as W2 (g). The value obtained from the following formula was defined as a non-volatile content.

Non-volatile content (% by mass)=100−(W1−W2)/(W1−W3)×100

[Measurement of Weight Average Molecular Weight of Copolymer]

The weight average molecular weight of the copolymer was measured by a GPC method. The detailed conditions are as follows.

Measuring device: HLC-8320 GPC (manufactured by Tosoh Corporation)
Column: α-M+α-M (manufactured by Tosoh Corporation)
Column temperature: 40° C.
Detector: differential refractometer
Eluant: N,N-dimethylformamide (DMF) solution of 60 mmol/L of $H_3PO_4$ and 50 mmol/L of LiBr
Flow rate: 1 m/min
Standard sample used for calibration curve: monodisperse polystyrene manufactured by Tosoh Corporation $5.26 \times 10^2$, $1.02 \times 10^5$, $8.42 \times 10^6$; monodisperse polystyrene manufactured by Nishio Kogyo Co., Ltd. $4.0 \times 10^3$, $3.0 \times 10^4$, $9.0 \times 10^5$ (each number represents the molecular weight)
Sample solution: DMF solution containing 0.5 wt % of solid content of the copolymer
Amount of sample solution injected: 100 μL

[Raw Materials Used]

The details of dispersants and raw materials of the dispersants used for the preparation of conductive material slurries, pastes for evaluating withstand voltage performance, and positive electrode pastes for evaluating battery in Examples and Comparative Examples are shown below and in Tables 1 and 2.

(Monomer A)
SMA: stearyl methacrylate (manufactured by SHIN-NAKAMURA CHEMICAL Co., Ltd., product number: NK-Ester S) (R4: $C_{18}H_{37}$)
SA: stearyl acrylate (manufactured by FUJIFILM Wako Pure Chemical Corporation) (R4: $C_{18}H_{37}$)

(Monomer B)
HEMA: 2-hydroxyethyl methacrylate (manufactured by FUJIFILM Wako Pure Chemical Corporation)
PEGMA (EO1): methoxyethyl methacrylate (manufactured by Tokyo Chemical Industry Co., Ltd.)
4-VPy: 4-vinylpyridine (manufactured by Tokyo Chemical Industry Co., Ltd.)
MAA: methacrylic acid (manufactured by FUJIFILM Wako Pure Chemical Corporation)
MAA: methacrylamide (manufactured by Tokyo Chemical Industry Co., Ltd.)
AA: acrylic acid (manufactured by FUJIFILM Wako Pure Chemical Corporation) (Monomer C)
PEGMA (EO9): methoxy polyethylene glycol methacrylate (manufactured by SHIN-NAKAMURA CHEMICAL Co., Ltd., product number: NK-Ester M-90G, average number of moles of ethylene oxide added: 9)
PEGMA (EO2): methoxy polyethylene glycol methacrylate (manufactured by SHIN-NAKAMURA CHEMICAL Co., Ltd., product number: NK-Ester M-20G, average number of moles of ethylene oxide added: 2)

(Other Raw Materials)
NMP: N-methyl-2-pyrrolidone (manufactured by FUJIFILM Wako Pure Chemical Corporation)
V-65B: 2,2'-azobis(2,4-dimethylvaleronitrile) (manufactured by FUJIFILM Wako Pure Chemical Corporation, initiator)
PVP (K-30): manufactured by FUJIFILM Corporation, weight average molecular weight: 40000 (catalog value)

TABLE 1

| Constitutional unit | | Monomer | General formula (1) | | | General formula (2) | | | | | General formula (3) | | General formula (4) | | | | |
|---|---|---|---|---|---|---|---|---|---|---|---|---|---|---|---|---|---|
| | | | $R^4$ | $R^1/R^2/R^3$ | $X^1$ | $R^5/R^6/R^7$ | $X^2$ | p | $R^8$ | $R^9$ | $R^{10}/R^{11}/R^{12}$ | $X^3$ | $R^{13}/R^{14}/R^{15}$ | $X^4$ | q | $R^{16}$ | $R^{17}$ |
| A | $a^1$ | SMA | 18 | H/H/CH$_3$ | O | | | | | | | | | | | | |
| | $a^2$ | SA | 18 | H/H/H | O | | | | | | | | | | | | |
| $B^1$ | $b^{11}$ | HEMA | | | | H/H/CH$_3$ | O | 1 | C$_2$H$_4$ | H | | | | | | | |
| | $b^{12}$ | PEGMA (EO1) | | | | H/H/CH$_3$ | O | 1 | C$_2$H$_4$ | CH$_3$ | | | | | | | |
| $B^2$ | $b^{21}$ | 4-VPy | | | | | | | | | H/H/H | pyridinyl group | | | | | |
| | $b^{22}$ | MAA | | | | | | | | | H/H/CH$_3$ | COOH | | | | | |
| | $b^{23}$ | MAAm | | | | | | | | | H/H/CH$_3$ | CONH$_2$ | | | | | |
| | $b^{24}$ | AA | | | | | | | | | H/H/H | COOH | | | | | |
| C | | PEGMA (EO9) | | | | | | | | | | | H/H/CH$_3$ | O | 9 | C$_2$H$_4$ | CH$_3$ |
| | | PEGMA (EO2) | | | | | | | | | | | H/H/CH$_3$ | O | 2 | C$_2$H$_4$ | CH$_3$ |

TABLE 2

Dispersant for positive electrode of power storage device

| | | Monomer A | | Monomer B | | | | | | Monomer C | | Initiator | Chain transfer agent | |
|---|---|---|---|---|---|---|---|---|---|---|---|---|---|---|
| | | | | Monomer B¹ | | | Monomer B² | | | | | | | |
| | Copolymer | SMA | SA | PEGMA (EO1) | HEMA | MAA | AA | 4-VPy | MAAm | PEGMA (EO9) | PEGMA (EO2) | V-65B | ME | Mw |
| Example 1 | A | 50 | | 50 | | | | | | | | 2.0 | | 65000 |
| 2 | B | 50 | | | 50 | | | | | | | 2.0 | | 45000 |
| 3 | C | 50 | | | | 20 | | 30 | | | | 2.0 | | 42000 |
| 4 | D | 50 | | | | | | 50 | | | | 2.0 | | 86000 |
| 5 | E | 50 | | | 30 | | | | 20 | | | 2.0 | | 66000 |
| 6 | F | 40 | | | 30 | | | 30 | | | | 2.0 | | 61000 |
| 7 | G | 40 | | 30 | 30 | | | | | | | 2.0 | | 75000 |
| 8 | H | 50 | | 20 | | | | | 30 | | | 2.0 | | 58000 |
| 9 | I | 50 | | 20 | | | | | 30 | | | 2.0 | | 8000 |
| 10 | J | 50 | | 20 | | | | | 30 | | | 1.4 | | 180000 |
| 11 | L | 50 | | 45 | 40 | | | | | 5 | | 2.0 | 0.5 | 65000 |
| 12 | M | 50 | | | | 30 | | | | | | 2.0 | | 60000 |
| Comparative Example 1 | N | 40 | | | | | | | | 30 | 10 | 2.0 | | 34000 |
| 2 | O | 40 | | | 30 | | | | | 50 | 30 | 2.0 | | 95000 |
| 3 | P | 50 | | 100 | | | | | | | | 2.0 | | 57000 |
| 4 | Q | | | 70 | | | | | 15 | | | 2.0 | | 47000 |
| 5 | K | 15 | 33.3 | | | | 66.7 | | | | | 2.0 | | 110000 |
| 6 | R | | | | | | PVP | | | | | | | |
| 7 | | | | | | | No dispersant | | | | | | | |
| 8 | | | | | | | | | 15 | | | 2.0 | | 40000 |

Evaluation

| | | Evaluation of dispersibility of conductive material slurry | | | Viscosity of conductive material slurry | | | Evaluation of withstand voltage performance (CV measurement) | | Evaluation of battery | | |
|---|---|---|---|---|---|---|---|---|---|---|---|---|
| | | Particle size of CNT | | | | | | | | | | |
| | Conductive material slurry | μm | Logarithmic value | Difference 1) | mPa·s | Logarithmic value | Difference 2) | Evaluation paste | Decomposition potential (V) | Total amount of decomposition | Positive electrode paste | DC resistance (Ω) | Capacity retention rate (%) |
| Example 1 | 1 | 0.46 | −0.34 | 1.38 | 62 | 1.79 | 1.05 | 1 | 4.80 | 10 | 1 | 33.5 | 84.3 |
| 2 | 2 | 0.35 | −0.46 | 1.50 | 44 | 1.64 | 1.50 | 2 | 4.90 | 10 | 2 | 32.0 | 88.0 |
| 3 | 3 | 0.37 | −0.43 | 1.47 | 95 | 1.98 | 0.87 | 3 | ≥5 | 0 | 3 | 34.4 | 89.1 |
| 4 | 4 | 0.49 | −0.31 | 1.35 | 94 | 1.97 | 0.87 | 4 | ≥5 | 5 | 4 | 27.5 | 92.9 |
| 5 | 5 | 0.44 | −0.36 | 1.40 | 79 | 1.90 | 0.95 | 5 | 4.95 | 5 | 5 | 26.5 | 93.5 |
| 6 | 6 | 0.37 | −0.43 | 1.47 | 88 | 1.94 | 0.90 | 6 | 4.80 | 5 | 6 | 28.0 | 89.6 |
| 7 | 7 | 0.35 | −0.46 | 1.50 | 42 | 1.62 | 1.52 | 7 | 4.95 | 20 | 7 | 28.0 | 86.7 |
| 8 | 8 | 0.44 | −0.36 | 1.40 | 85 | 1.93 | 0.92 | 8 | 4.95 | 5 | 8 | 28.5 | 93.3 |
| 9 | 9 | 0.43 | −0.37 | 1.41 | 76 | 1.88 | 0.96 | 9 | 4.95 | 5 | 9 | 29.0 | 82.0 |

TABLE 2-continued

|  |  |  |  |  |  |  |  |  |  |  |  |  |
|---|---|---|---|---|---|---|---|---|---|---|---|---|
| | 10 | 0.70 | −0.15 | 1.20 | 120 | 2.08 | 0.77 | 10 | 4.95 | 5 | 10 | 29.0 | 93.1 |
| | 11 | 0.49 | −0.31 | 1.35 | 65 | 1.81 | 1.03 | 11 | 4.80 | 30 | 11 | 36.5 | 73.7 |
| | 12 | 0.34 | −0.47 | 1.51 | 50 | 1.70 | 1.15 | 12 | 4.75 | 30 | 12 | 35.5 | 76.3 |
| Comparative Example | 1 | 0.38 | −0.42 | 1.46 | 140 | 2.15 | 0.70 | 13 | 4.60 | 70 | 13 | 39.5 | 67.9 |
| | 2 | 0.39 | −0.41 | 1.45 | 66 | 1.82 | 1.03 | 14 | 4.60 | 90 | 14 | 33.0 | 64.0 |
| | 3 | 0.52 | −0.28 | 1.33 | 95 | 1.98 | 0.87 | 15 | 4.60 | 140 | 15 | 36.0 | 63.6 |
| | 4 | 7.7 | 0.89 | 0.15 | 550 | 2.74 | 0.10 | 16 | 4.70 | 15 | 16 | 59.5 | 65.2 |
| | 5 | 0.61 | −0.21 | 1.26 | 170 | 2.23 | 0.61 | 17 | 4.85 | 10 | 17 | 39.0 | 74.9 |
| | 6 | 11 | 1.04 | 0.00 | 650 | 2.81 | 0.03 | 18 | — | — | 18 | — | — |
| | 7 | 0.50 | −0.30 | 1.34 | 220 | 2.34 | 0.50 | 19 | 4.20 | 100 | 19 | 55.0 | 67.2 |
| | 8 | 11 | 1.04 | 0.00 | 700 | 2.85 | 0.00 | 20 | ≥5 | 0 | 20 | 74.0 | 65.4 |

1) Difference (x − y): x represents a logarithmic value of the particle size of CNTs of Comparative Example 8 and y represents a logarithmic value of the particle size of CNTs of each example
2) Difference (X − Y): X represents a logarithmic value of the viscosity of the conductive material slurry of Comparative Example 8 and Y represents a logarithmic value of the viscosity of the conductive material slurry of each example

[Example of Synthesis of Copolymer A]

A mixed solution containing 50 g of SMA, 50 g of PEGMA (EO1), and 70 g of an NMP mixture was prepared as a "dropping monomer solution". A mixed solution containing 1 g of V-65B and 5 g of NMP was prepared as an "initiator solution". A mixed solution containing 1 g of V-65B and 30 g of NMP was prepared as a "dropping initiator solution". Next, 80 g of NMP and the above initiator solution were placed in a separable flask (reaction vessel) equipped with a reflux tube, an agitator, a thermometer, and a nitrogen introduction tube. The inside of the reaction vessel was replaced with nitrogen, and the temperature in the reaction vessel (i.e., the temperature of the raw materials charged) was increased to 65° C. by heating. After the temperature in the reaction vessel reached 65° C., the "dropping monomer solution" and the "dropping initiator solution" were simultaneously added dropwise over 3 hours. Upon the completion of dropping, the resulting solution was stirred for 1 hour. Next, the temperature of the solution was raised to 75° C. for about 30 minutes, and then the solution was further stirred for 2 hours. Subsequently, the solution was cooled to 40° C. or less. To adjust the concentration, NMP was added to the reaction vessel, and thus an NMP solution of a copolymer A was obtained. The NMP solution of the copolymer A had a non-volatile content of 40% by mass and a weight average molecular weight of 65,000. The amount of the initiator used was 2.0 parts by mass (1.4 parts by mass for a copolymer J) with respect to 100 parts by mass of the total amount of the monomers used for the synthesis of the copolymer A

[Example of Synthesis of Copolymers B to R]

NMP solutions of copolymers B to R were obtained in the same manner as described in [Example of synthesis of copolymer A] except that the mass ratio of the monomers used for the synthesis of each of the copolymers B to R in the preparation of the "dropping monomer solution," and the amount of the initiator used for the synthesis of the copolymers were set to the values shown in Table 2. A chain transfer agent was used only in the synthesis of the copolymer I, and the amount of the chain transfer agent was 0.5 parts by mass with respect to 100 parts by mass of the total amount of the monomers used for the synthesis of the copolymer I. The chain transfer agent was mercaptoethanol.

[Evaluation of Dispersibility]

The dispersibility of the conductive material slurry was evaluated in the following manner. Conductive material slurries were prepared by the following preparation method, and then the viscosity and the particle size of CNTs of each of the conductive material slurries were measured. Table 2 shows the results.

(Example 1)

First, 0.3 g of carbon nanotubes (NC7000 manufactured by Nanocyl, average diameter: 9.5 nm, average length: 1.5 μm) was placed in a 60 mL media vial, followed by the addition of 0.15 g of the NMP solution of the copolymer A (solid content: 0.06 g; 20 parts by mass of the copolymer A with respect to 100 parts by mass of the CNTs), which was prepared as described in [Example of synthesis of copolymer A]. Then, NMP was added to this solution so that the total weight was 30 g.

The resulting mixture was dispersed with a horn type ultrasonic homogenizer (UT-300 manufactured by NIHON-SEIKI KAISHA LTD.) at an output of 30 μm for 10 minutes while stirring. Thus a conductive material slurry 1 (containing 0.2% by mass of the copolymer A) of Example 1 was produced.

<Evaluation Criteria of Dispersibility>

The viscosity and the particle size of the CNTs of a conductive material slurry were used as the criteria for determining whether the dispersibility of the conductive material slurry was good or bad. The viscosity and the particle size of the CNTs of the conductive material slurry were measured in the following manner.

Since the viscosity and the particle size of the CNTs of the conductive material slurry could be affected by the type and amount of the conductive materials used and the other components, the determination of whether the dispersibility was good or bad was made by comparison with a conductive material slurry that had been prepared by the above method without the addition of a dispersant.

Specifically, the conductive material slurries of Examples 1 to 12 and the conductive material slurries of Comparative Examples 1 to 7 were evaluated relative to the conductive material slurry of Comparative Example 8 that did not contain a dispersant.

Slurry viscosity: The dispersibility is good when a difference between X and Y (X-Y) is 0.5 or more, better when the difference (X-Y) is 0.8 or more, and even better when the difference (X-V is 1.0 or more, where X represents a logarithmic value of the viscosity of the conductive material slurry 20 of Comparative Example 8 and Y represents a logarithmic value of the viscosity of the conductive material slurry of each example.

CNT particle size: The dispersibility is good when a difference between x and y (x-y) is 0.5 or more, better when the difference (x-y) is 0.8 or more, much better when the difference (x-y) is 1.0 or more, and even better when the difference (x-y) is 1.3 or more, where x represents a logarithmic value of the particle size of the CNTs of the conductive material slurry 20 of Comparative Example 8 and y represents a logarithmic value of the particle size of the CNTs of the conductive material slurry of each example.

<Measurement of Viscosity>

The viscosity of the conductive material slurry 1 of Example 1 was measured at 25° C. with an E-type viscometer. The viscosity was 62 mPa·s and the dispersibility of the conductive material slurry 1 was good.

<Measurement of Particle Size>

The conductive material slurry 1 of Example 1 was diluted 500 times with N-methyl-2-pyrrolidone and placed in a glass cell. Then, the glass cell was mounted on LA-920 manufactured by HORIBA Ltd. to measure the particle size of the CNTs at 20° C. The particle size was 0.46 μm and the dispersibility of the conductive material slurry 1 was good.

Examples 2 to 12, Comparative Examples 1 to 7

In Examples 2 to 12 and Comparative Examples 1 to 7, the conductive material slurries 2 to 19 were prepared in accordance with the preparation method in Example 1 except that NMP solutions of the copolymers B to R and an NMP solution of PVP were used instead of the NMP solution of the copolymer A, respectively. Then, the dispersibility of each of the conductive material slurries 2 to 19 was evaluated.

In Comparative Example 6, the withstand voltage performance and the battery characteristics, as will be described below, were not evaluated, since the CNTs were not dispersed at all.

Comparative Example 8

In Comparative Example 8, the conductive material slurry 20 was prepared in accordance with the preparation method in Example 1 except that 0.15 g of NMP was used instead of the NMP solution of the copolymer A Then, the dispersibility of the conductive material slurry 20 was evaluated. The viscosity and the particle size of the CNTs of the conductive material slurry 20 of Comparative Example 8 were 700 mPa·s and 11 μm, respectively, and the CNTs were not dispersed at all.

[Evaluation of Withstand Voltage Performance]

The withstand voltage performance of the dispersant was evaluated in the following manner. Pastes for evaluating the withstand voltage performance (abbreviated as an "evaluation paste" in the following) were prepared by the following preparation method, and then each of the evaluation pastes was measured by cyclic voltammetry.

Example 1

First, 7.5 g (solid content: 0.6 g) of a 8 mass % PVDF solution (HF polymer L #7208 manufactured by KUREHA CORPORATION), 0.6 g of acetylene black (AB) (HS-100 manufactured by Denka Company Limited) as conductive materials, 0.15 g (solid content: 0.06 g) of the NMP solution of the copolymer A, which was prepared as described in [Example of synthesis of copolymer A], and 0.45 g of NMP were weighed in a screw tube No. 7 (manufactured by Maruemu Corporation) and stirred until the mixture became homogeneous. Then, the mixture was stirred with a rotation-revolution mixer (AR-100 manufactured by THINKY CORPORATION) at 2000 rpm for 20 minutes. Thus an evaluation paste 1 of Example 1 was produced.

<Cyclic Voltammetry (CV) Measurement>

The evaluation paste 1 of Example 1 was applied on an aluminum current collecting foil with an applicator and dried at 100° C. for 30 minutes to form a CV measuring electrode with a mating composition AB:PVDF:dispersant=10:10:1 (mass ratio). The electrode thus obtained was punched and dried under reduced pressure at 80° C. overnight. A tripolar cell was assembled using the dried electrode, a counter electrode, and a reference electrode in a dry atmosphere. Both the counter electrode and the reference electrode were made of metallic lithium. Subsequently, an electrolyte solution was injected. The electrolyte solution was 1 mol/L $LiPF_6$ EC/DEC=3/7 (vol %). A CV measurement was performed on the resulting cell by a potentiostat (manufactured by TOYO Corporation) at a sweep potential of 3 to 5 V and a sweep rate of 1 mV/s. Table 2 shows the results.

Examples 2 to 12, Comparative Examples 1 to 5 and 7

In Examples 2 to 12 and Comparative Examples 1 to 5 and 7, the evaluation pastes 2 to 17 and 19 were prepared in accordance with the method in Example 1 except that the NMP solutions of the copolymers B to Q and the NMP solution of PVP were used instead of the NMP solution of the copolymer A, respectively. Then, the withstand voltage performance was evaluated on each of the evaluation pastes 2 to 17 and 19.

Comparative Example 8

In Comparative Example 8, the evaluation paste 20 was prepared in accordance with the method in Example 1 except that 0.15 g of NMP was used instead of the NMP solution of the copolymer A. Then, the withstand voltage performance was evaluated on the evaluation paste 20.

[Calculation of Decomposition Potential and Area S]

Figure 2:
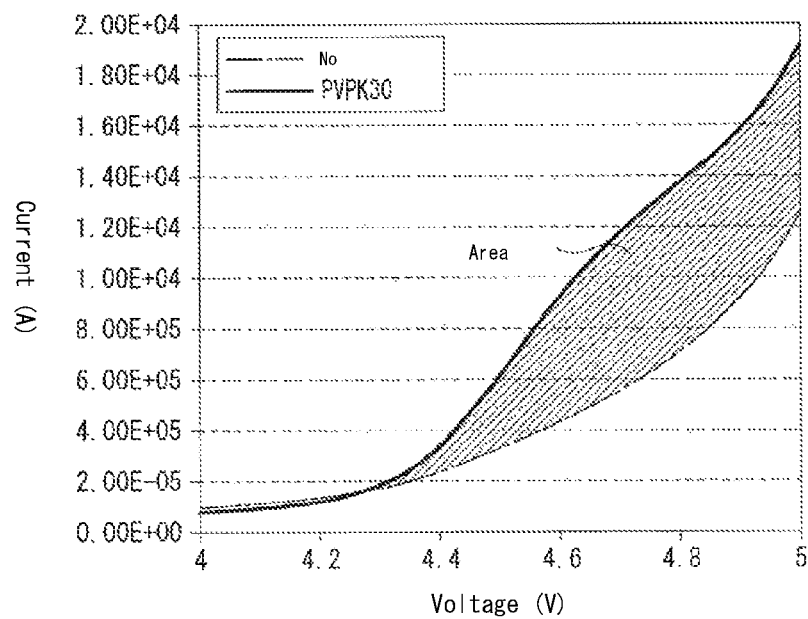
FIG. 2 is a diagram showing the CV measurement results of CV measuring electrodes that are formed by using pastes for evaluating the withstand voltage performance in Comparative Examples 7 and 8, respectively, and showing the calculation of an area S that indicates the amount of decomposition reaction derived from the dispersant.

FIG. 1 shows the CV measurement results of the CV measuring electrode that was formed by using the evaluation paste 20 of Comparative Example 8, which did not contain a dispersant. FIG. 2 is a graph that is superimposed on the graph of FIG. 1 and shows the CV measurement results of the CV measuring electrode that was formed by using the evaluation paste 19 of Comparative Example 7, which contained PVP as a dispersant. The current value was increased as the decomposition reaction of the dispersant occurred. The voltage at which the current value started to rise (i.e., the potential at which the current value started to deviate from the graph of the CV measurement results of Comparative Example 8 using the evaluation paste 20 that did not contain a dispersant) was taken as a decomposition potential. In this manner, decomposition potentials of the CV measuring electrodes that were formed by using the evaluation pastes of Examples 1 to 12 and Comparative Examples 1 to 7 were measured, respectively. Moreover, an area value was calculated by accumulating a difference in the current value between the CV measuring electrode containing the dispersant and the CV measuring electrode containing no dispersant (Comparative Example 8, see FIG. 1). The area value was taken as the amount of decomposition. The shaded portion in FIG. 2 corresponds to the total amount of decomposition of PVP and is defined as an area S. The area S values were determined for each of Examples 1 to 12 and Comparative Examples 1 to 5 and 7. To clarify the comparison of the total amount of decomposition, Table 2 shows the relative area values with the area S value for the CV measuring electrode containing PVP used as a reference of 100. In Table 2, the smaller the relative area value, the smaller the amount of the dispersant decomposed.

[Evaluation of Battery Characteristics]

<Production of Positive Electrode Paste for Battery Evaluation>

First, 0.8 g of conductive materials (AB), 10 g (solid content: 0.8 g) of a PVDF solution, and 0.2 g (solid content: 0.08 g) of the NMP solution of the copolymer A which was prepared as described in [Example of synthesis of copolymer A], were mixed and stirred with a rotation-revolution mixer at 2000 rpm for 20 minutes. Then, 18.32 g of a positive electrode active material (CELLSEED NMC532 manufactured by NIPPON CHEMICAL INDUSTRIAL CO., LTD.) and 1.8 g of a solvent (N-methyl-2-pyrrolidone manufactured by Wako Pure Chemical Industries, Ltd.) were added to the mixture and further stirred with the rotation-revolution mixer at 2000 rpm for 20 minutes, resulting in a positive electrode paste for battery evaluation (abbreviated as a "positive electrode paste" in the following) 1. The solid content of the paste included the positive electrode active material, the conductive materials, the binder, and the dispersant. The total solid content concentration in the positive electrode paste was 64.3% by mass. The mass ratio of the positive electrode active material, the conductive materials, the binder, and the dispersant was 91.6:4:4:0.4 (in terms of solid content).

<Production of Electrode and Battery>

The positive electrode paste was applied on an aluminum foil with a thickness of 20 μm so that the positive electrode capacity density was 1.0 to 1.5 $mAh/cm^2$, followed by pre-drying at 100° C. for 30 minutes. Then, the aluminum foil mated with the positive electrode paste was punched to a diameter of 13 mm and pressed to form an electrode (positive electrode). The electrode was dried in a vacuum dryer at 100° C. for 12 hours. Next, a separator with a diameter of 16 mm and a coin-shaped metallic lithium with a diameter of 15 mm and a thickness of 0.5 mm were placed on the positive electrode. Thus a 2032 type coin cell was produced. The electrolyte solution was 1M LiPF$_6$ EC/DEC (volume ratio)=1/1.

<Measurement of Direct Current Resistance>

The cell thus obtained was charged and discharged in 3 cycles under the following charge-discharge conditions 1. The cell was charged at 0.2 CA for 2.5 hours so that the SOC (remaining capacity) was set to 50%. Then, the cell was discharged for 10 seconds by varying the current value. The direct current resistance of the cell was calculated based on the slope that was derived from the voltage drops and the corresponding current values during the discharge. The direct current resistance was 33.5Ω.

(Charge-Discharge Conditions 1)

30° C., 0.2 CA, charge 4.2 V CC/CV 1/10 C cutoff
discharge 0.2 CA CC 3.0 V cutoff <High Voltage Cycle Evaluation>

After the cell was charged and discharged in 3 cycles under the charge-discharge conditions 1, the cell was charged and discharged in 50 cycles under the following charge-discharge conditions 2, and a capacity retention rate (discharge capacity at the end of 50 cycles/discharge capacity in the first cycle) was calculated. The higher the capacity retention rate (%), the more reduced the degradation of the cell over time. The capacity retention rate of the cell produced by using the positive electrode paste 1 of Example 1 was 84.3%.

(Charge-Discharging Conditions 2)

30° C., 1 CA, charge 4.5V CC/CV 1/10 cutoff
discharge 1 CA CC 3.0 V cutoff

Examples 2 to 12, Comparative Examples 1 to 5 and 7

In Examples 2 to 12 and Comparative Examples 1 to 5 and 7, the positive electrode pastes 2 to 17 and 19 were prepared in accordance with the method in Example 1 except that the NMP solutions of the copolymers B to Q and the NMP solution of PVP were used instead of the NMP solution of the copolymer A, respectively. Then, the battery characteristics were evaluated on each of the positive electrode pastes 2 to 17 and 19. Table 2 shows the results.

Comparative Example 8

In Comparative Example 8, the positive electrode paste 20 was prepared in accordance with the method in Example 1 except that 0.2 g of NMP was used instead of the NMP solution of the copolymer A. Then, the battery characteristics were evaluated on the positive electrode paste 20. Table 2 shows the results.

INDUSTRIAL APPLICABILITY

The dispersant for a positive electrode of a power storage device of the present invention not only improves the dispersibility of the conductive materials, but also is less likely to be decomposed at a high voltage. Therefore, when a positive electrode for a battery is formed by using the positive electrode paste containing the dispersant for a positive electrode of a power storage device of the present invention and/or the conductive material slurry containing the dispersant, the battery can have a high energy density and maintain high durability even at a high potential. This can contribute to an improvement in the performance of a power storage device such as a lithium ion battery.

The invention claimed is:

1. A dispersant for a positive electrode of a power storage device, comprising a copolymer that contains a constitutional unit A represented by the following general formula (1) and at least one constitutional unit B selected from the group consisting of a constitutional unit B$^1$ represented by the following general formula (2) and a constitutional unit B$^2$ represented by the following general formula (3), wherein a total content of the constitutional unit A and the constitutional unit B in the copolymer is 80% by mass or more, and the content of the constitutional unit A in all constitutional units of the copolymer is 35% by mass or more:

[Chemical Formula 1]

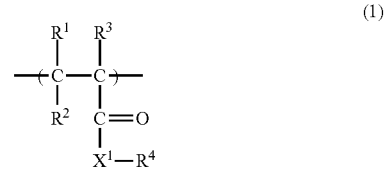

(1)

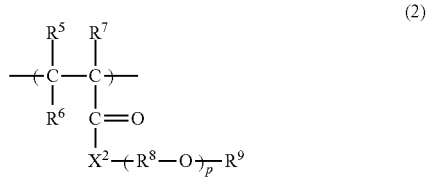

(2)

(3)

where R$^1$, R$^2$, R$^3$, R$^5$, R$^6$, R$^7$, R$^{10}$, R$^{11}$, and R$^{12}$ are the same or different and represent a hydrogen atom, a methyl group, or an ethyl group, X$^1$ represents an oxygen atom or NH, R4 represents a hydrocarbon group having 16 to 30 carbon atoms, X$^2$ represents an oxygen atom, R$^8$ represents a linear or branched alkylene group having 2 to 4 carbon atoms, p represents 1, R$^9$ represents a hydrogen atom or a methyl group, and X$^3$ represents a pyridinyl group that may have a hydrocarbon group having 1 to 4 carbon atoms, wherein the constitutional unit B is a combination of the constitutional unit B$^1$ and the constitutional unit B$^2$, or the constitutional unit B$^2$ alone.

2. The dispersant for a positive electrode of a power storage device according to claim 1, wherein a ratio of the content of the constitutional unit B to the content of the constitutional unit A (constitutional unit B/constitutional unit A) of the copolymer is 0.2 or more and 1.9 or less.

3. The dispersant for a positive electrode of a power storage device according to claim 1, wherein the content of the constitutional unit A in all the constitutional units of the copolymer is 80% by mass or less.

4. The dispersant for a positive electrode of a power storage device according to claim 1, wherein the content of the constitutional unit B in all the constitutional units of the copolymer is 5% by mass or more and 65% by mass or less.

5. The dispersant for a positive electrode of a power storage device according to claim 1, wherein the copolymer further contains a constitutional unit C represented by the following general formula (4):

[Chemical Formula 2]

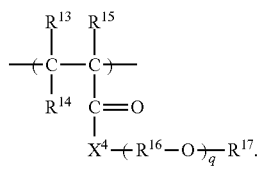

(4)

where $R^{13}$, $R^{14}$, and $R^{15}$ are the same or different and represent a hydrogen atom, a methyl group, or an ethyl group, $R^{16}$ represents a linear or branched alkylene group having 2 to 4 carbon atoms, $X^4$ represents an oxygen atom, q represents 2 or more, and $R^{17}$ represents a hydrogen atom or a hydrocarbon group.

6. The dispersant for a positive electrode of a power storage device according to claim 1, wherein a weight average molecular weight of the copolymer is 1,000 or more and 500,000 or less.

7. The dispersant for a positive electrode of a power storage device according to claim 1, wherein the constitutional unit B is a constitutional unit derived from at least one selected from the group consisting of 2-hydroxyethyl methacrylate, methoxyethyl methacrylate, and 4-vinylpyridine.

8. A conductive material slurry for a battery, comprising conductive materials, the dispersant for a positive electrode of a power storage device according to claim 1, and a solvent.

9. The conductive material slurry for a battery according to claim 8, wherein the conductive materials include carbon nanotubes.

10. The conductive material slurry for a battery according to claim 8, wherein the conductive materials include acetylene black.

11. A method for producing a positive electrode paste for a battery, the method comprising:
mixing the conductive material slurry for a battery according to claim 8 and a positive electrode active material.

12. A positive electrode paste for a battery, comprising a positive electrode active material, conductive materials, the dispersant for a positive electrode of a power storage device according to claim 1, and a solvent.

13. The positive electrode paste for a battery according to claim 12, wherein the solvent is N-methyl-2-pyrrolidone.

14. A positive electrode for a battery, comprising the dispersant for a positive electrode of a power storage device according to claim 1.

15. The dispersant for a positive electrode of a power storage device according to claim 1, wherein the constitutional unit B is a combination of the constitutional unit $B^1$ and the constitutional unit $B^2$, or a constitutional unit derived from 4-vinylpyridine alone.

* * * * *